United States Patent [19]
Horng

[11] Patent Number: 5,959,377
[45] Date of Patent: Sep. 28, 1999

[54] MINIATURE DC BRUSHLESS MOTOR HAVING RADIAL AIR GAP AND SINGLE COIL WITH AXIAL WINDING

[75] Inventor: Alex Horng, Kaohsiung, Taiwan

[73] Assignee: Sunonwealth Electric Machine Industry Co., Ltd., Kaohsiung, Taiwan

[21] Appl. No.: 09/179,689

[22] Filed: Oct. 27, 1998

[51] Int. Cl.[6] ................................................. H02K 3/04
[52] U.S. Cl. ..................................... 310/40 MM; 310/180
[58] Field of Search ............................. 310/180, 40 MM, 310/156

[56] References Cited

U.S. PATENT DOCUMENTS 5,289,089  2/1994  Aoki ........................................ 318/254

*Primary Examiner*—Nestor Ramirez
*Assistant Examiner*—Judson H. Jones
*Attorney, Agent, or Firm*—Stevens, Davis, Miller & Mosher, L.L.P.

[57] ABSTRACT

A miniature DC brushless motor having a radial air gap and a single coil with axial winding includes a stator having a single coil with axial winding, a rotor with a permanent magnet, and a control circuit. Two terminals of the single coil are electrically connected to the control circuit that controls the conducting direction of current of the single coil to generate alternate rotational magnetic fields, thereby driving the permanent magnet to turn.

4 Claims, 4 Drawing Sheets

5,959,377

MINIATURE DC BRUSHLESS MOTOR HAVING RADIAL AIR GAP AND SINGLE COIL WITH AXIAL WINDING

BACKGROUND OF THE INVENTION

1. Field of the Invention

The present invention relates to a miniature DC (direct current) brushless motor having a radial air gap and a single coil with axial winding.

2. Description of the Related Art

U.S. Pat. No. 5,289,089 to Aoki issued on Feb. 22, 1994 discloses a small sized DC motor at a high torque and with a high efficiency to reduce noise generation and suitable for forming in an integrated circuit. Although the Aoki patent solves the problems of a conventional motor drive (see FIG. 2 of said U.S. patent), the axial thickness of the stator cannot be reduced to meet the requirement for a miniature motor shaft. This is because the winding for the stator coil is radial, as shown in FIGS. 6 and 7 of the drawings. FIGS. 6 and 7 ti respectively show a four-pole stator 100 and a two-pole stator 100 constructed in accordance with the teaching of Aoki in said U.S. Pat. No. 5,289,089. In FIG. 6, the stator 100 includes four arms (poles) 102 extending outwardly from a central axial hole 101 thereof while in FIG. 7, the stator 100 includes two arms (poles) 102 extending outwardly from a central axial hole 101 thereof. The winding procedure for the radial coil is time-consuming, as the coil must be wound around each arm 102 at one time without interruption. In addition, the distribution of the magnetic field is not uniform. There is, therefore, a need in miniature DC motors with minimum axial thickness and high motor power for an easy winding procedure that can be accomplished at one time without any interruption.

SUMMARY OF THE INVENTION

It is a primary object of the present invention to provide a miniature DC brushless motor having a radial air gap and a single coil with axial winding that can be wound at one time without any interruption to thereby improve the winding efficiency.

It is another object of the present invention to provide a miniature DC brushless motor having a radial air gap and a single coil with axial winding to reduce the axial thickness of the motor.

It is a primary object of the present invention to provide a miniature DC brushless motor having a radial air gap and a single coil with axial winding that may lower the cost of the motor and improve the power of the motor.

In order to achieve the above objects, the present invention provides a stator having a single coil with axial winding, a rotor with a permanent magnet, and a control circuit. Two terminals of the single coil are electrically connected to the control circuit that controls the conducting direction of current of the single coil to generate alternate rotational magnetic fields, thereby driving the permanent magnet to turn.

A Hall element of the motor senses the polarity (N or S) of the rotor and outputs a pulse signal. When the output of the Hall element is high, the control circuit is activated to turn on a first set of transistors and turn off a second set of transistors. Thus, a positive voltage is formed at the first terminal of the coil while a negative voltage is formed at the second terminal of the coil such that current flows from the first terminal to the second terminal. To the contrary, when the output of the Hall element is low, the first set of transistors is rendered "OFF" and the second set of transistors is rendered "ON". Thus, a negative voltage is formed at the first terminal of the coil while a positive voltage is formed at the second terminal of the coil such that current flows from the second terminal to the first terminal. Repeated operations generate alternate current that passes through the coil. As a result, the coil generates alternate magnetic fields to drive the motor.

Other objects, advantages, and novel features of the invention will become more apparent from the following detailed description when taken in conjunction with the accompanying drawings.

DETAILED DESCRIPTION OF THE PREFERRED EMBODIMENT

Figure 5:
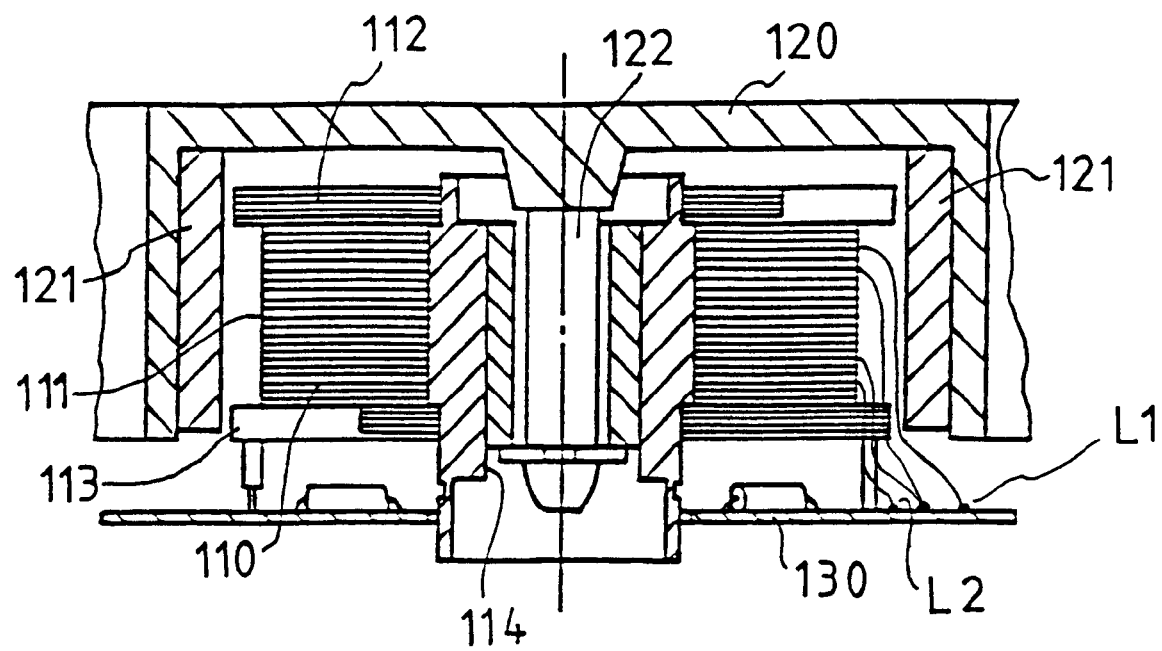
FIG. 5 is a sectional view of a conventional DC motor having a double coil with axial winding.
Figure 6:
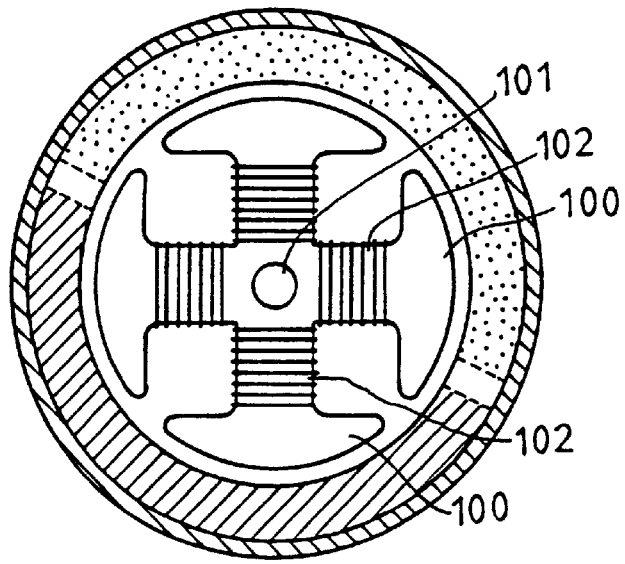
FIG. 6 is a schematic cross sectional view of a conventional four-pole stator with axial winding.
Figure 7:
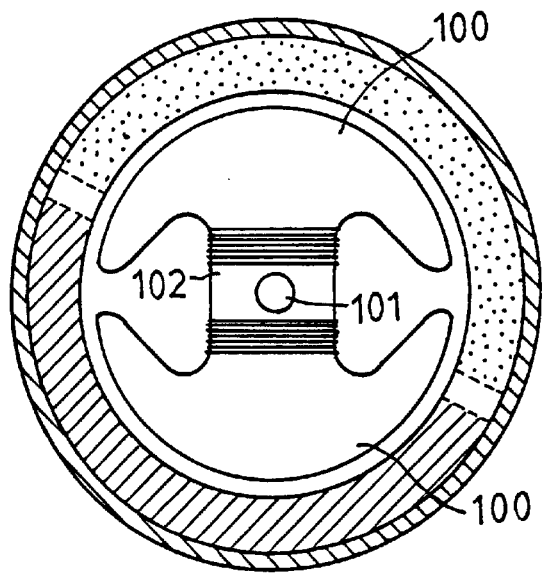
FIG. 7 is a schematic cross sectional view of a conventional two-pole stator with axial winding.

FIG. 5 illustrates a conventional DC motor with an axial double coil that mainly includes a stator 110, a rotor 120 and a control circuit 130. The stator 110 includes a coil seat 111 around which a double coil is wound along an axial direction while three terminals are led out. Respectively mounted to upper and lower ends of the coil seat 111 are upper and lower polar plates 112 and 113. The rotor 120 includes a permanent magnet 121 mounted to an inner periphery thereof and thus forms a radial gap with respect to the upper and lower plates 112 and 113 on the stator seat 110 for induction. The rotor 120 includes an axle 122 rotatably mounted in an axial hole 114 of the stator seat 110 such that the rotor 110 may rotate relative to the stator seat 110. The control circuit 130 is mounted below the stator seat 110 to detect the phase of the permanent magnet 121 on the rotor 120 to control the conducting direction of the coil on the coil seat 111, thereby rendering the double coil of the coil seat 111 to be conductive alternately. The coil seat 111 has two sets of axial coils L1 and L2 wound therearound, thereby forming three terminals electrically connected to the control circuit 130. The control circuit 130 makes the coils L1 and L2 to conduct alternately in response to the detected phase of the permanent magnet 121. Thus, the upper polar plate 112 and the lower polar plate 113 generate alternate magnetic fields to drive the rotor 120. The control circuit 130 may employ a control circuit (e.g., a drive circuit shown in FIG. 2 of U.S. Pat. No. 5,289,089) for conventional DC motors with a double coil.

The stator coil with axial winding illustrated in FIG. 5 may eliminate the time-consuming drawback which existed in conventional radial winding and thus may greatly reduce the winding cost for the stator coil. In addition, the magnetic field generated by a coil with axial winding is distributed more uniformly than that generated by a coil with radial winding, as axial winding is distributed more uniformly than radial winding. Although DC motors with such axial double winding have eliminated the drawbacks of conventional motors with radial winding, three terminals are required for electrically connecting the two coils to the control circuit. Therefore, when a half of the winding procedure is completed, a terminal must be lead out before proceeding with the other half of the winding procedure. Namely, the winding work cannot be accomplished at one time without interruption. In addition, the two coils are alternately driven such that the torque generated by the motor is relatively low, as the effective turns of the winding is reduced by 50%. Furthermore, the coil not driven will generate high temperature due to hysteresis of current. Moreover, switching of the drive current tends to generate an inverse voltage and noise and thus lowers the motor efficiency.

The present invention is intended to modify the DC motor having an axial double coil to a DC motor having an axial single coil to solve the above problems.

Figure 1:
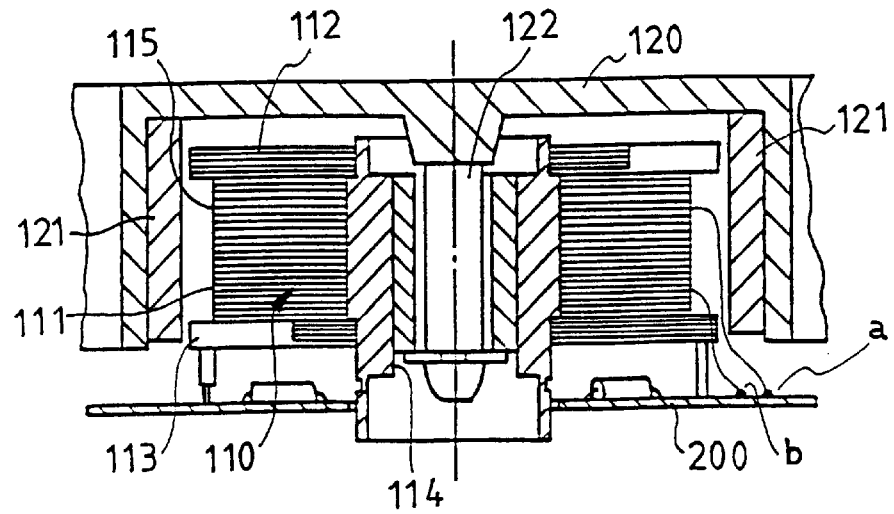
FIG. 1 is a sectional view of a miniature DC motor having a single coil with axial winding in accordance with the present invention.

Referring now to FIG. 1 that schematically illustrates a DC motor having a radial gap and a single coil with axial winding in accordance with the present invention. The motor generally includes a stator 110, a rotor 120 and a control circuit 200. The stator 110 includes a coil seat 111 around which a single coil 115 is wound along an axial direction while two terminals "a" and "b" are led out. Respectively mounted to upper and lower ends of the coil seat 111 are upper and lower polar plates 112 and 113. The rotor 120 includes a permanent magnet 121 mounted to an inner periphery thereof and thus forms a radial gap with respect to the upper and lower plates 112 and 113 on the stator seat 110 for induction. The rotor 120 includes an axle 122 rotatably mounted in an axial hole 114 of the stator seat 110 such that the rotor 120 may rotate relative to the stator seat 110. The control circuit 200 is mounted below the stator seat 110 and electrically connected to the terminals "a" and "b" of the coil 115 to detect the phase of the permanent magnet 121 on the rotor 120, thereby controlling the conducting direction of the coil 115 on the coil seat 111. The control circuit 200 makes the coil 115 be alternately conductive in two directions (clockwise/counterclockwise) in response to the detected phase of the permanent magnet 121. Thus, the upper polar plate 112 and the lower polar plate 113 generate alternate magnetic fields to drive the rotor 120.

Figure 2:
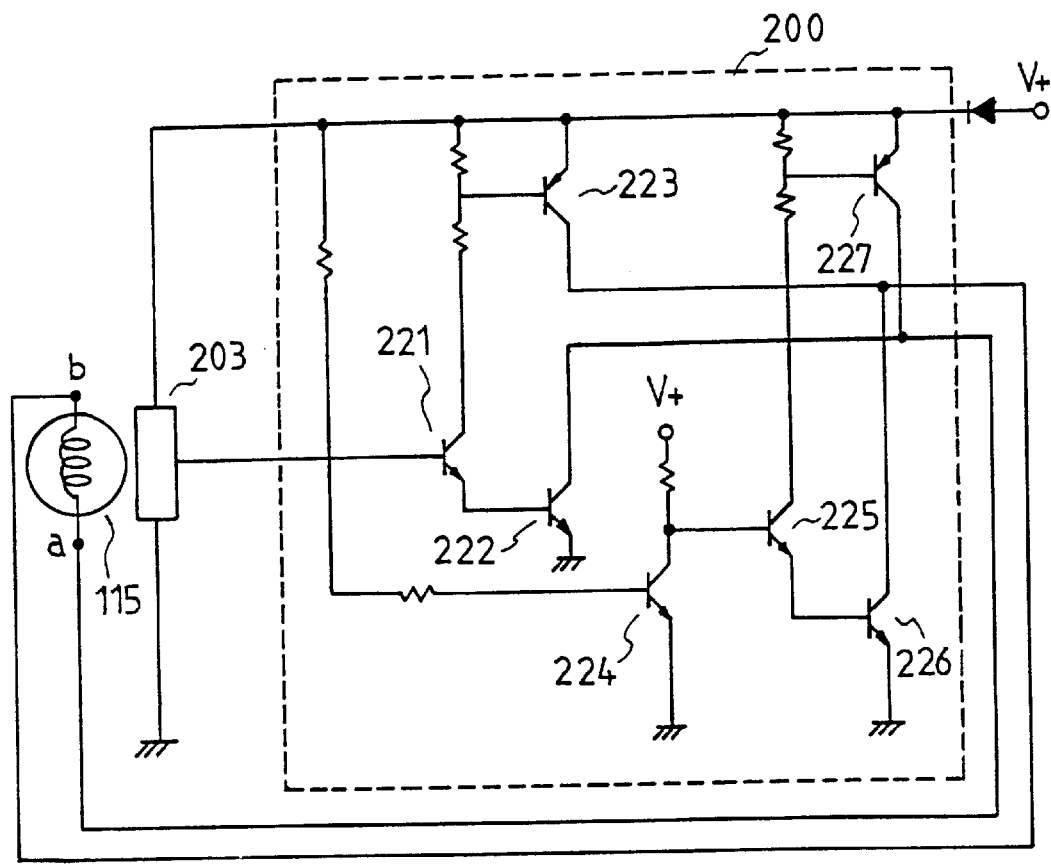
FIG. 2 is a drive circuit for the miniature DC motor having a single coil with axial winding in accordance with the present invention.

Referring to FIG. 2, the control circuit 200 includes a Hall element 203 that detects the polarity (N or S) of the rotor 120 and outputs a pulse signal. When the output of the Hall element 203 is high, a first set of transistors 221, 222, and 223 is rendered "ON", transistor 224 is also "ON", while a second set of transistors 225, 226, and 227 is rendered "OFF". Thus, a positive voltage is formed at the first terminal "a" of the coil 115 while a negative voltage is formed at the second terminal "b" of the coil 115 such that current flows from the first terminal "a" to the second terminal "b". To the contrary, when the output of the Hall element 203 is low, the first se of transistors 221, 222, and 223 is rendered "OFF", the transistor 224 is also "OFF", while the second set of transistors is rendered "ON". Thus, a negative voltage is formed at the first terminal "a" of the coil 115 while a positive voltage is formed at the second terminal "b" of the coil 115 such that current flows from the second terminal "b" to the first terminal "a". Repeated operations generate alternate current that passes through the coil 115. As a result, the coil 115 generates alternate magnetic fields to drive the rotor 120 of the motor to turn.

Figure 3:
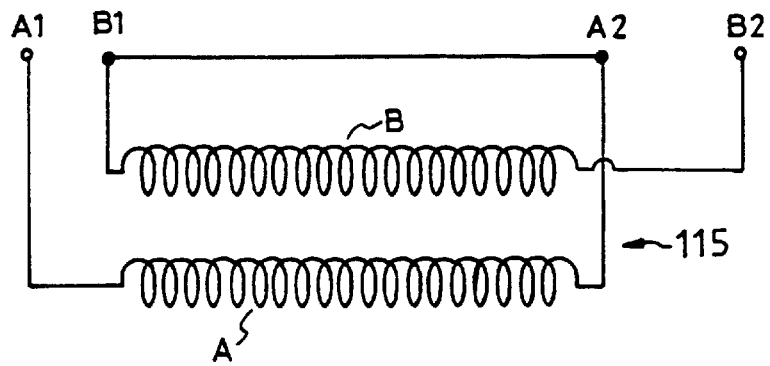
FIG. 3 is a schematic diagram of a single coil with dual axial winding in accordance with the present invention.

The coil 115 may be either a single enamel wire or wound from two enamel wires. FIG. 3 illustrates a coil 115 wound from two enamel wires A and B. A terminal A2 of wire A is electrically connected to a terminal B1 of wire B, while the other terminal A1 of wire A and the other terminal B2 of wire B are electrically connected to the control circuit 200 to form an axial single coil of double winding. As the single coil 115 is formed by simultaneously winding two enamels, the winding time can be shortened while obtaining the same effective coil turns. The enamels A and B can be given different colors at outer surfaces thereof for distinction.

Figure 4:
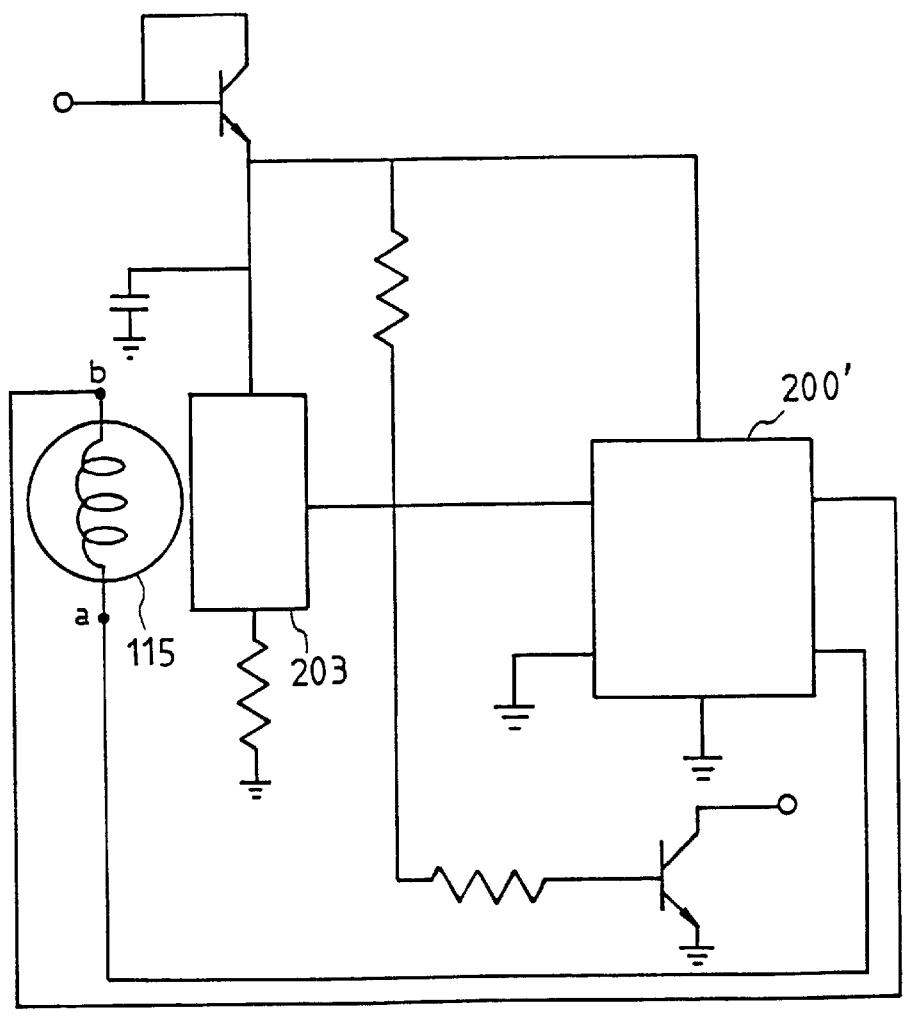
FIG. 4 is another drive circuit for the miniature DC motor having a single coil with axial winding in accordance with the present invention.

FIG. 4 illustrates a circuit in which the motor stator coil is comprises of a single coil 115 having two terminals a and b led out to a control circuit 200'. All transistors and resistance elements can be constructed as a small IC (integrated circuit) chip to minimize the resultant motor.

When compared with the above-mentioned DC motor with the axial double coil, the effective number of turns of the coil seat 111 of the present invention is twice as that of the double coil. As a result, the efficiency of miniature DC motors can be largely improved under the same size. In addition, the winding is easier, i.e., no leading out is required at the half winding procedure. Furthermore, the inverse voltage and noise that are generated in alternate conduction of the double coil are eliminated, while the motor efficiency is improved and the manufacturing cost is lowered.

The following table illustrates the differences between a DC motor with a double coil and a DC motor with an axial single coil in accordance with the present invention under the same conditions in the blades, outer casings, and coil seats.

|  | axial double coil | axial single coil |
| --- | --- | --- |
| effective turns of winding | ½ of actual turns | actual turns |
| rated voltage | 5 VDC | 5 VDC |
| operating voltage range | 4–5 VDC | 3–6 VDC |
| starting voltage | 4 VDC | 3 VDC |
| reference RPM | 7500 RPM | 7500 RPM |
| volume of air driven | 2.4 CFM | 2.4 CFM |
| static pressure | 0.08 inch-$H_2O$ | 0.09 inch-$H_2O$ |
| rated current | 0.09 AMP | 0.04 AMP |
| rated power | 0.45 W | 0.2 W |

According to the above table, it is appreciated that a DC motor with an axial single coil in accordance with the present invention, when compared with a DC motor with an axial double coil of the same size, has a doubled effective turns, while the starting voltage, rated current, and rated power are reduced significantly. Namely, the effectiveness and characteristics of the motor with an axial single coil are different from those of the motor with an axial double coil. Accordingly, the miniature DC motor with an axial single coil in accordance with the present invention has a simplified structure and reduced volume and cost as well as improved efficiency.

Although the invention has been explained in relation to its preferred embodiment, it is to be understood that many other possible modifications and variations can be made without departing from the spirit and scope of the invention as hereinafter claimed.

What is claimed is:

1. A miniature DC brushless motor having a radial air gap and a single coil with axial winding, comprising:

a stator seat including a central axial hole, an upper polar plate, and a lower polar plate;

an axial single coil wound along a longitudinal direction of the central axial hole and having two terminals;

a rotor including an axle rotatably mounted in the central axial hole of the stator seat and including a magnet with a north pole and a south pole;

a control circuit electrically connected with the two terminals of the axial single coil and including a sensor element for detecting a phase of polarity of the magnet on the rotor to output a control signal to thereby make a current direction of the axial single coil change alternately, thereby forming magnetic fields that are alternately changed in the directions thereof for driving the rotor to rotate.

2. The miniature DC brushless motor having a radial air gap and a single coil with axial winding as claimed in claim 1, wherein the control circuit includes a first driving circuit that is electrically connected to one of the terminals of the single coil and a second driving circuit that is electrically connected to the other of the terminals of the single coil, the first driving circuit and the second driving circuit being conductive alternately in response to the control signal from the sensor element.

3. The miniature DC brushless motor having a radial air gap and a single coil with axial winding as claimed in claim 1, wherein the single coil includes a first enamel and a second enamel wound around the stator seat, the first enamel including a first end and a second end electrically connected to the control circuit, and the second enamel having a first end electrically connected to the first end of the first enamel and a second end electrically connected to the control circuit.

4. The miniature DC brushless motor having a radial air gap and a single coil with axial winding as claimed in claim 3, wherein the first enamel and the second enamel are provided with different colors at outer surfaces thereof.

* * * * *